United States Patent
Konczak

(10) Patent No.: US 6,447,033 B1
(45) Date of Patent: Sep. 10, 2002

(54) RAPID ATTACK FIRE HOSE AND RESCUE HOOK

(76) Inventor: Rick Konczak, 4983 S. Rockmont Rd., Poplar, WI (US) 54864

( * ) Notice: Subject to any disclaimer, the term of this patent is extended or adjusted under 35 U.S.C. 154(b) by 0 days.

(21) Appl. No.: 09/758,730

(22) Filed: Jan. 11, 2001

(51) Int. Cl.7 .................................................. B65G 7/12
(52) U.S. Cl. .............................. 294/15; 294/26; 294/92
(58) Field of Search ................................ 294/15–18, 26, 294/82.1, 82.17, 92; 239/525; 248/75, 76

(56) References Cited

U.S. PATENT DOCUMENTS

| | | | |
|---|---|---|---|
| 96,682 A | | 11/1869 | Edson |
| 730,119 A | * | 6/1903 | Hanson et al. ............. 294/26 X |
| 850,983 A | | 4/1907 | Valiquette et al. |
| 1,058,926 A | * | 4/1913 | Toole ........................... 294/16 |
| 1,465,510 A | * | 8/1923 | Cote ............................ 294/26 |
| 1,944,868 A | | 1/1934 | Anderson |
| 2,038,701 A | | 4/1936 | Anderson |
| 2,243,387 A | | 5/1941 | Livingston |
| 2,329,711 A | | 9/1943 | Gilsenan |
| 2,349,887 A | | 5/1944 | Selberg ........................ 81/119 |
| 2,655,300 A | | 10/1953 | Willms |
| 2,671,684 A | * | 3/1954 | Giroux ......................... 294/18 |
| 2,832,384 A | * | 4/1958 | Wicks et al. .............. 294/92 X |
| 2,997,327 A | * | 8/1961 | Bjalme ......................... 294/92 |
| 3,708,196 A | * | 1/1973 | Snell ............................ 294/26 |
| D255,774 S | | 7/1980 | Soucy ......................... D8/371 |
| 4,856,834 A | | 8/1989 | Lancaster et al. ............. 294/15 |
| 5,029,921 A | * | 7/1991 | Houghton et al. ............ 294/26 |
| 5,217,240 A | * | 6/1993 | Gardenhour et al. ...... 294/26 X |
| 5,542,730 A | | 8/1996 | Riesselmann ............... 294/157 |
| 5,579,966 A | | 12/1996 | Krumweide et al. ........ 224/637 |
| 5,791,704 A | * | 8/1998 | Thompson et al. ........... 294/17 |
| 5,979,840 A | | 11/1999 | Hollister et al. .............. 248/76 |

\* cited by examiner

*Primary Examiner*—Johnny D. Cherry
(74) *Attorney, Agent, or Firm*—Elizabeth D. Lewen

(57) ABSTRACT

A hose gripper for use by firefighters is disclosed. The hose gripper includes a handle attached to a hook having a cradle at one end thereof. A heavy, pressurized fire hose rests in the cradle, which is more easily moved by the fire fighter.

6 Claims, 5 Drawing Sheets

RAPID ATTACK FIRE HOSE AND RESCUE HOOK

FIELD OF THE INVENTION

The present invention relates to an apparatus for gripping and rapidly moving an uncoiled fluid carrying hose.

BACKGROUND

Modern fire fighting technique requires fire fighters to respond to an alarm in a minimum length of time. Delays in responding could cause an exponentially higher loss of property due to fire, and, more importantly, the possibility of a loss of life. One of the main techniques used by fire fighters involves dousing the burning area with massive amounts of water, supplied either by a fire hydrant or by a water truck if a fire hydrant is not conveniently located. Typically, fire fighters transfer water from a supply source to the burning area by means of pressurized hoses. When a hose is pressurized, it becomes heavy and is even more difficult to move due to the presence of water on the outside of the hose, which acts as a lubricant. To make matters worse, while the firefighter is discharging water (i.e., the nozzle has been opened), the nozzle reaction, (which is the rearward reactive force created by the water flowing out of the nozzle at high velocity and volume) could be substantial enough to make it difficult or even dangerous to hold or move the hose while attacking the fire. During fire fighting operations, fire fighters are often required to negotiate multiple flights of stairs in darkness while moving a wet, heavy, pressurized hose, making the operation even more difficult. Weakened floor surfaces in burning buildings are also known, which can be unable to support the weight of a heavily loaded fire fighter, causing him/her to fall through often to serious injury or even death.

Several solutions to the problem of moving pressurized hoses during fire fighting operations have been proposed. One "home made" solution simply uses a nylon strap provided with two loops, one to surround the pressurized hose and the other for the fire fighter's hand. The device is ineffective due to its relatively slow set up procedure and difficulty in maintaining a grasp on this anatomically unfriendly and slippery tool. Similarly and resulting in the same problems, many fire fighters simply tie a length of rope around the hose in an effort to provide a degree of control. Another attempted solution, as disclosed in U.S. Pat. No. 5,542,730, issued to Riesselmann, is similar to the Keenan Loop, but includes parallel hose-encircling straps and utilizes hook-and-loop fasteners. U.S. Pat. No. 5,979,840, issued to Hollister et al. discloses an apparatus for gripping a fluid carrying hose having a jaw sized for placement around a pressurized hose and a spring-loaded plunger attached to a T-shaped handgrip. The hose is placed within the jaw, whereupon the plunger is allowed to contact the hose, securing it in place. The Hollister et al. apparatus involves numerous moving mechanical parts that are prone to failure when the apparatus is most needed, rendering it ineffective. U.S. Pat. No. 4,856,834, issued to Lancaster et al. discloses a fire hose-gripping device having a U-shaped open-ended member for receiving a fire hose. The Lancaster et al. device has a straight handle perpendicularly attached to and extending upward from the U-shaped member on an axis extending through a midpoint of the arms of the U-shaped member. The effectiveness of the Lancaster et al. device is limited due to the fire fighter having to squeeze the handle while simultaneously lifting on it. Insofar as managing and controlling hose that is discharging water, these problems are compounded by factors related to the different size of fire hose. Smaller diameter hose (1½ inch to 1¾ inch) has been managed using all the aforementioned techniques with success limited by the shortcomings mentioned above. With larger diameter hose (e.g., 2½ inch), greater dynamic forces are created, making the much heavier hose even more difficult to control. For such larger hose, several techniques have been used, from assigning two or more firefighters to control the hose with their hands, to tying the hose to a fixed object, or looping the hose on the ground and tying it to itself, sometimes referred to as the "Keenan Hose Loop". Unfortunately, none of these techniques are very efficient or effective when dealing with this larger hose.

What is clearly needed, therefore, is a device that is simple in construction and design, that can instantly engage a fire hose, is sturdy and massive, and is naturally grasped and carried by the fire fighter. A device that fulfills the identified needs as well as helping to arrest the fall of a heavily laden fire fighter falling through a collapsing floor would provide even greater benefits.

SUMMARY OF THE INVENTION

In a first aspect, the present invention comprises a hook defining a closed section further defining an upper section, a lower section, a longitudinal section, and an extension extending from the lower section toward the upper section, the extension and the lower section forming a cradle. The cradle defines a first distance between an inner surface of the upper section and an inner surface of the lower section. The cradle also defines a second distance between an inner surface of the longitudinal section and an inner surface of the extension. An open section of the hook defines an opening between the upper section and the extension. A handle is attached to a midpoint of the upper section of the hook.

A second aspect of the rapid attack fire hose and rescue hook of the present invention comprises a hook defining a cradle and an opening. A handle defining a grasping member is attached to the hook such that the grasping member is substantially perpendicular to and attached to the hook on a longitudinal axis extending from a center point of the cradle through a center point of the grasping member.

A third aspect of the present invention comprises a hook defining a closed section wherein the closed section defines an upper section, a lower section and a longitudinal section and an extension extending from the lower section toward the upper section. An open section between the upper section and lower section defines an opening. A handle defining a grasping member is attached to the hook such that the grasping member is substantially perpendicular to a longitudinal axis extending from a midpoint of the lower section to a midpoint of the upper section through a midpoint of the grasping member.

DETAILED DESCRIPTION OF THE INVENTION INCLUDING A BEST MODE

Definitions

"Cradle" refers to the portion of the inner surface of the hook formed by the lower extension, lower section of the hook and the lower portion of the longitudinal section of the hook.

Nomenclature

Figure 1:
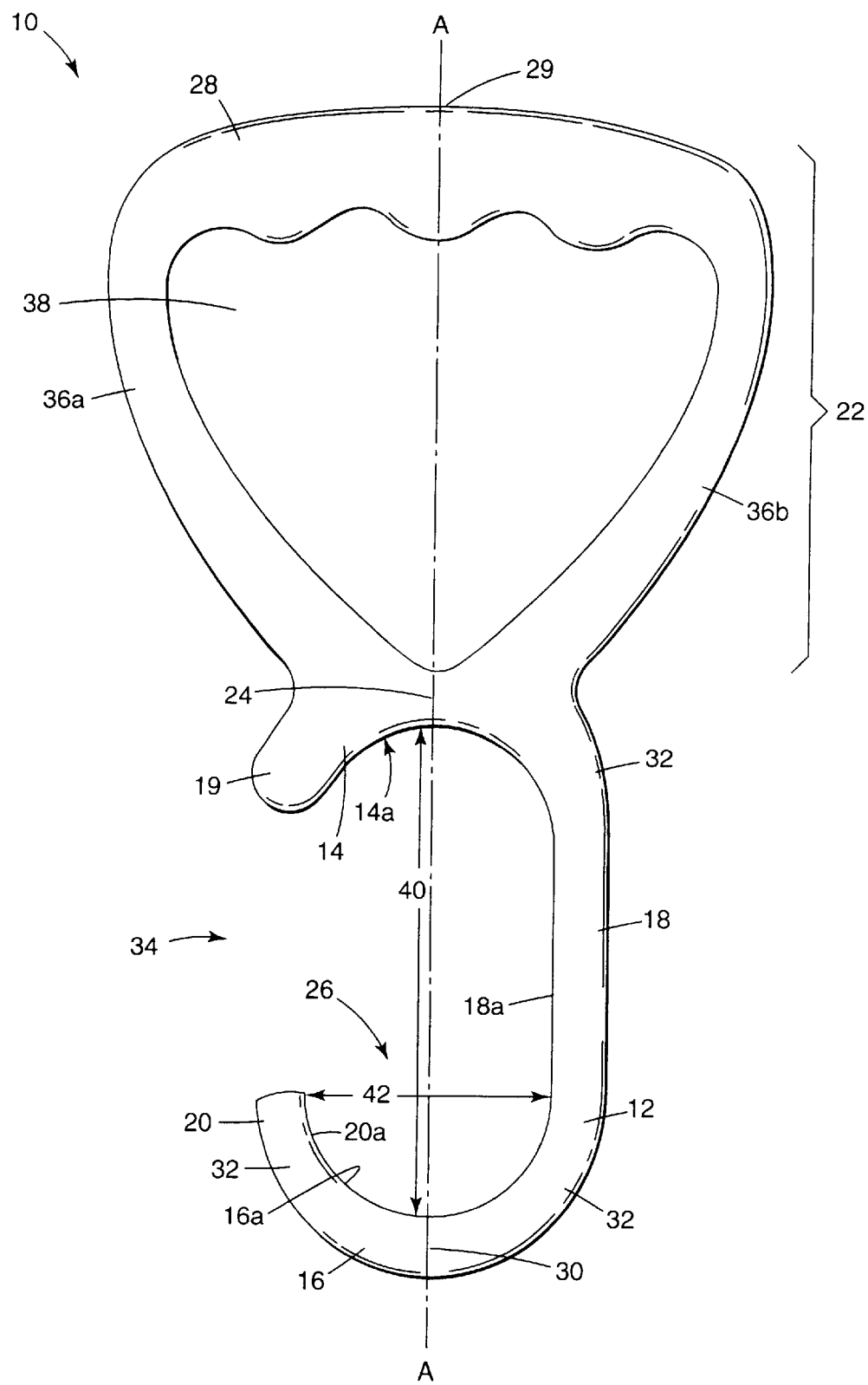
FIG. 1 shows a plan view of the hose gripper.
Figure 2:
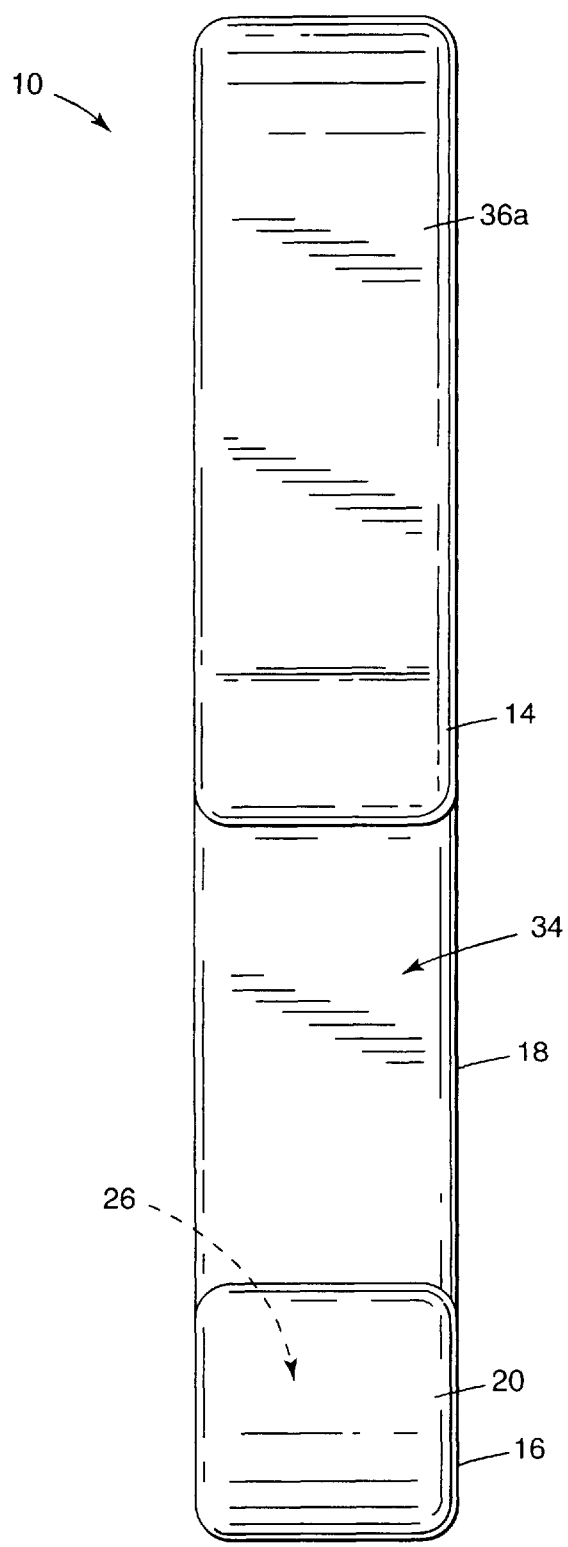
FIG. 2 shows a view of the hose gripper rotated ninety degrees from the view shown in FIG. 1.
Figure 3:
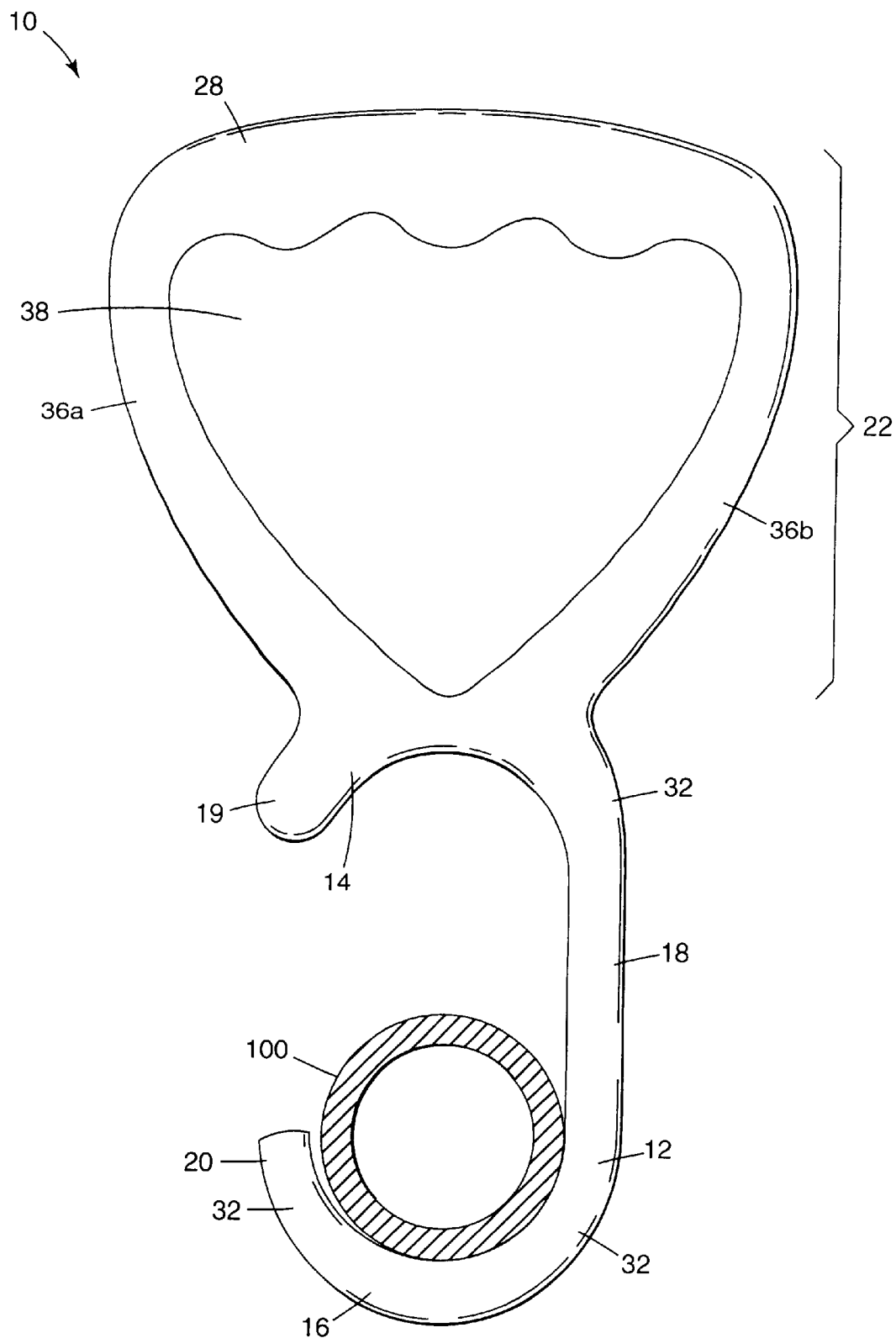
FIG. 3 shows a view of the hose gripper as shown in FIG. 1 having a fluid hose resting in the cradle.

10 Hose Gripper
  12 Hook
  14 Upper Section of Hook
  14a Inner Surface of Upper Section
  16 Lower Section of Hook
  16a Inner Surface of Lower Section
  18 Longitudinal Section of Hook
  18a Inner Surface of Longitudinal Section
  19 Upper Extension
  20 Lower Extension
  20a Inner Surface of Lower Extension
  22 Handle
  24 Midpoint of Upper Section of Hook
  26 Cradle
  28 Grasping Member
  29 Midpoint of Grasping Member
  30 Midpoint of Lower Section of Hook
  32 Closed Section of Hook
  34 Open Section of Hook
  36a First Side Member
  36b Second Side Member
  38 Gripping Aperture
  40 First Distance
  42 Second Distance
  100 Fire Hose Construction The fire hose 100 hose gripper 10 as shown in FIGS. 1–3 allows fire fighters an improved ability to rapidly move a heavy, pressurized, fire hose 100 into a burning building or area. As discussed below, the hose gripper 10 is able to quickly engage a fire hose 100, and by means of a simple gripping motion by a fire fighter, able to effectively move a fire hose 100 with minimum effort. Should a fire fighter encounter a weakened floor and fall through, the hose gripper 10 will continue to engage the fire hose 100, and, assuming the fire fighter maintains his/her grip, arrest or prevent the fall of the fire fighter through the floor until help arrives.

As shown in FIG. 1, the hose gripper 10 comprises a hook 12 defining a closed section 32 and an open section 34. The closed section 32 further defines an upper section 14, a lower section 16, a longitudinal section 18, an optional upper extension 19, and a lower extension 20. As best shown in FIG. 3, a cradle 26 sized to engage a fire hose 100 of a particular dimension, is defined by the inner surfaces (unnumbered) of the longitudinal section 18, lower section 16 and lower extension 20 of the hook 12. The open section 34 of the hook 12 is defined between the termination point (unnumbered) of the upper extension 19 and the termination point (unnumbered) of the lower extension 20. As best shown in FIGS. 1 and 3, in a plan view the hook approximates an oval shape having a contiguous section missing. A first distance 40 is defined as the distance between an inner surface 14a of the upper section 14 and an inner surface 16a of the lower section 16. A second distance 42 is defined as the distance between an inner surface 18a of the longitudinal section 18 and an inner surface 20a of the lower extension 20. The approximate ratio of the first distance 40 to the second distance 42 is 2:1. This ratio is a preferred embodiment only and should not be considered to be otherwise limiting.

Figure 4:
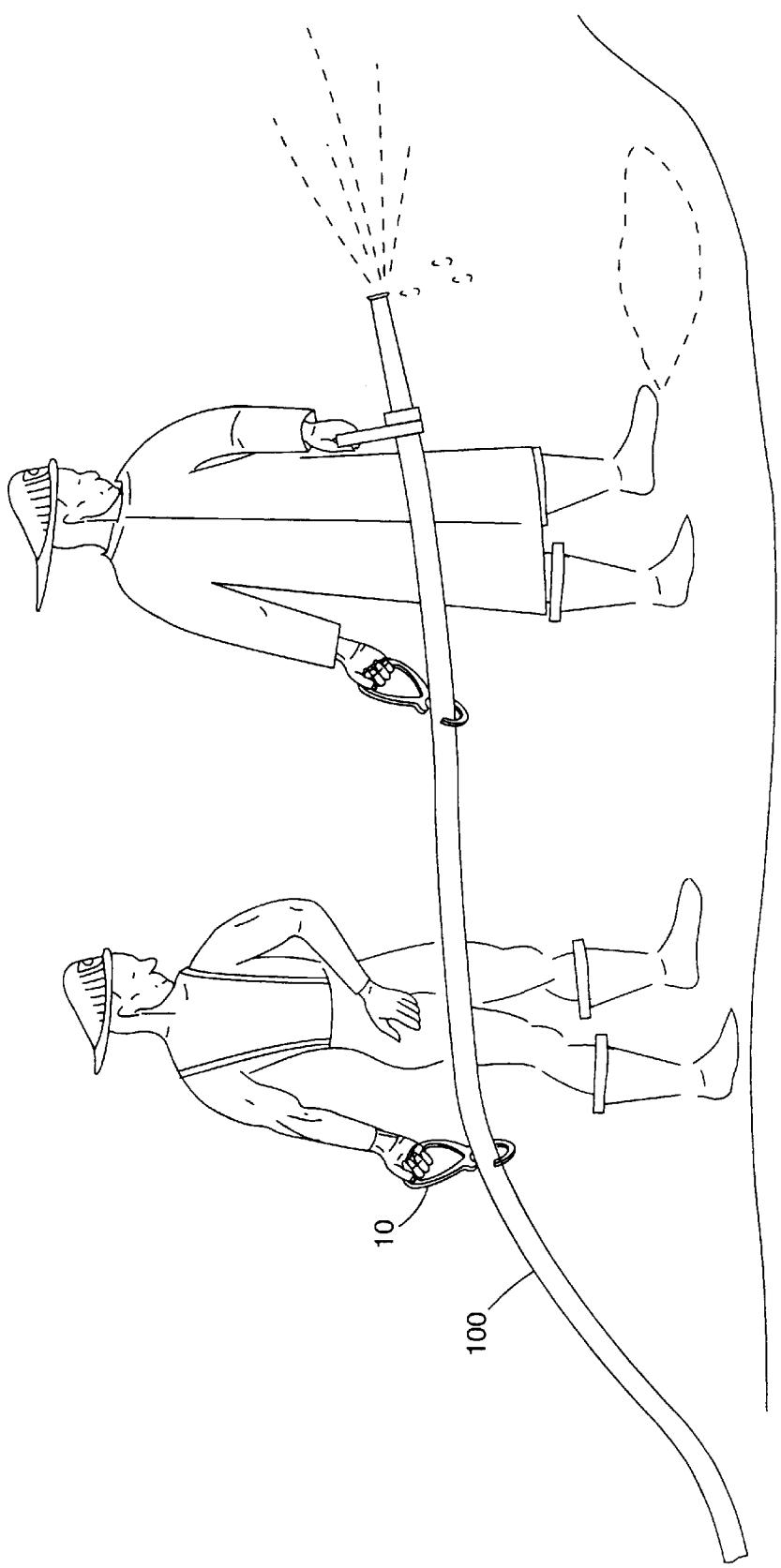
FIG. 4 shows a view of the hose gripper as used by two fire fighters during fire fighting operations.

A handle 22 is attached to the hook 12. The handle 22 comprises a grasping member 28 that is attached to the upper section 14 of the hook 12 by first side member 36a and second side member 36b. The handle 22 is preferably attached to the hook 12 so that the grasping member 28 is centered on longitudinal axis A—A, which extends through the midpoint 29 of the grasping member 28, through the midpoint 24 of the upper section 14 of the hook 12 and the midpoint 30 of the cradle 26. As best shown in FIG. 1, grasping member 28 preferably has a length greater than the width of a clenched, heavily gloved human hand. This results in a handle 22 having a gripping aperture 38 allowing the gloved hand (not shown) of a fire fighter to grip the grasping member 28 allowing the fire fighter's fingers, as best shown in FIG. 4, to be substantially parallel with the longitudinal axis (unnumbered) of a fire hose 100 engaged by the hose gripper 10. In a preferred embodiment, this is accomplished by attaching the handle 22 to the hook 12 so that the gripping aperture 38 is directly above and coplanar with the space defined by the cradle 26. This is best shown by comparing FIGS. 1 and 2, which show the hose gripper 10 from plan and end views, respectively. As best shown in FIG. 2, the first side member 36a forms the outer boundary of the gripping aperture 38, which is disposed directly above and in the same plane as the cradle 26.

Additional embodiments comprising different arrangements of the gripping aperture 38 and cradle 26 are also contemplated by and therefore within the scope of the invention. For example, the handle 22 and gripping aperture 38, instead of being coplanar, could be arranged so as to be perpendicular with each other (not shown), or set together at any of an infinite number of particular angular combinations. Further, the angle of the grasping member 28 to the hook 12 need not be set absolutely perpendicular to the longitudinal axis A—A, but may be offset at any particular angle for ergonomic reasons. Finally, an embodiment allowing adjustability of the angle between the handle 22 and gripping aperture 38 is also contemplated by and therefore within the scope of the invention. Such an embodiment could attach separate handle (not shown) and hook (not shown) components together in a changeable plurality of positions using a simple nut and bolt through a male/female star arrangement.

In a preferred embodiment, the hose gripper 10 is made from a single piece of cast aluminum or aluminum alloy, due to its light weight, strength, ease of manufacture, and low cost. In another embodiment, the hose gripper 10 could be machined from aluminum or steel. In a further embodiment, the hose gripper 10 could be made from heat tolerant plastic or composite materials. Finally, any of the embodiments discussed could be fully or partially coated with heat tolerant plastic materials to improve the grippability of both the grasping member 28 and the cradle 26.

In a preferred embodiment, the hose gripper 10 is sized to be able to accommodate a fire hose 100 having a diameter of between one and three inches. This requires a hose gripper 10 having a cradle 26 with a width and open section 34 able to accept a fire hose 100 of the appropriate size. In other words, for example, to be able to receive and engage a one-inch fire hose 100, the hose gripper 10 requires a cradle 26 and open section 34 having a dimension something greater than one inch.

Use

Using the hose gripper 10 of the present invention requires the fire fighter to insert the fire hose 100 through the open section 34 of the hook 12. The fire hose 100 can be either pressurized or non-pressurized prior to being received by the hose gripper 10. When the fire hose 100 is inserted through the open section 34, assuming the hose gripper 10 is positioned so the grasping member 28 is facing toward the fire fighter as when in use, the fire hose 100 is pulled by gravity into the cradle 26, where it will rest. There is an amount of play between the upper section 14 of the hook 12 and the cradle 26. The hose gripper 10 is effective either when the open section 34 faces away from or toward the fire fighter when in use. Following being received by the hose gripper 10, a fire fighter grips the grasping member 28 using a natural hand gripping motion. As best shown in FIG. 4, the effect of the play is to allow the fire fighter wielding the hose gripper 10 to walk slightly ahead of the hose gripper 10 along the fire hose 100, causing the hose gripper 10 and fire fighter's hand to trail slightly behind. Being able to walk ahead of the hose gripper 10 results in the hose gripper 10 assuming a slight tilt toward the fire fighter. The tilt causes an amount of leverage to be applied against the fire hose 100 by the hose gripper 10, which multiplies the amount of friction applied by the contacting surfaces (unnumbered) of the upper section 14 and lower section 16 of the hook 12 against the pressurized fire hose 100. This increases the ability of the fire fighter to move the fire hose 100. Another advantage of being able to tilt the hose gripper 10 is that a more natural gripping action for the fire fighter is provided. The fire hose 100 is then rapidly and efficiently moved by the fire fighter gripping the grasping member 28 with either hand, with the fire hose 100 held by the cradle 26. The present invention allows the fire fighter to grip the grasping member 28 of the hose gripper 10 using the muscles of the hand in a natural grip, while simultaneously lifting the fire hose 100 using the more substantial muscles of the arms, back and legs. This causes less fatigue than other methods and devices used in fire fighting, permitting a longer effective period available to the fire fighter. A further advantage to having an amount of play in the hook 12 between the fire hose 100 and the inner surface (unnumbered) of the upper section 14 is that it allows the hose gripper 10 to more easily slide along the fire hose 100 when necessary. The need for sliding along the fire hose 100 occurs when a fire fighter finds him/herself in a dense smoke environment and needs to regress. Sliding the hose gripper 10 along the fire hose 100 provides a clear path to safety in an otherwise blind or near blind environment.

Figure 5:
FIG. 5 shows a view of the hose gripper used in a "handle down" technique.
Figure 6:
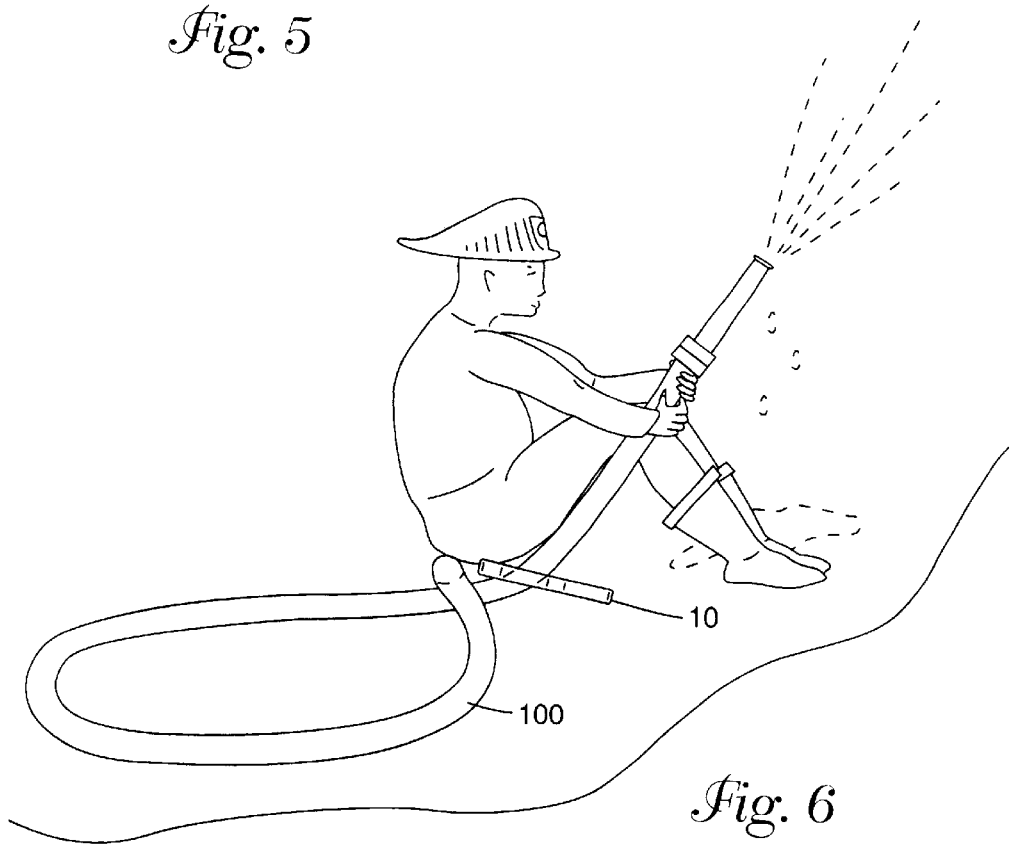
FIG. 6 shows a view of the hose gripper used in a "handle down" technique, combined with a traditional "Keenan Loop" technique.

The hose gripper 10 also allows the firefighter to efficiently and effectively control the hose while discharging water. The invention does so by allowing the firefighter to use an anatomically correct grasp and the more substantial back and leg muscles to counteract the nozzle reaction force created by water flowing out of the nozzle at high volume and pressure. As best shown in FIGS. 5 and 6, the hose gripper 10 can be used in any attitude while attached to the hose 10, including a handle 22 down attitude, wherein the invention can become an anchor device if the firefighter pins the hose 100 and hose gripper 10 between his body and the ground or floor. FIG. 5 shows a "straight on" technique, while FIG. 6 shows a technique combining using a the handle 22 down attitude combined with a traditional "Keenan Loop" technique.

An additional use for the hose gripper 10 involves using it as a safety hook. Fire fighting frequently involves great risk to the fire fighter due to weakened floor structures in burning buildings. Such weakened floor structures are not always apparent during the immediacy and chaos of fire fighting operations. It is known for heavily laden fire fighters to break through such weakened floors during fire fighting operations, often causing serious injury or even death to the fire fighter. Should a fire fighter using the hose gripper 10 fall through a weakened floor, if he/she is able to maintain his/her grip on the hose gripper 10, it will rotate around the fire hose 100. Assuming the fire fighter is able to hang on, the fire hose 100 then can prevent the fire fighter from falling through due to the strength of the hose being capable of supporting the typical 200+ pound weight of a heavily laden fire fighter until help arrives.

The hose gripper 10 can also, due to its relatively massive and solid construction, be used as a hammer-like tool to quickly and easily break through glass or other structures needing accessing during fire fighting operations. Although the present invention has been described in considerable detail with reference to certain preferred versions thereof, other versions are also possible. Therefore, the spirit and scope of the appended claims should not be limited to the description of the preferred versions contained herein.

What is claimed is:

1. A method of carrying an uncoiled, pressurized fire hose, comprising the steps of:
    (a) obtaining an implement, including at least:
        (1) a hook, comprising:
            (A) a laterally extending upper section,
            (B) a laterally extending lower section longitudinally spaced from said upper section,
            (C) a longitudinally extending central section interconnecting said upper section and said lower section,
            (D) a longitudinally extending upper extension laterally spaced from said central section and extending from said upper section in a first longitudinal direction towards said lower section,
            (E) a longitudinally extending lower extension laterally spaced from said central section and extending from said lower section in a second longitudinal direction towards said upper section, and
            (F) wherein said lower extension and said lower section form a cradle and said upper extension and said lower extension are longitudinally spaced to form an opening, and
        (2) a grasping member attached to a lateral midpoint of said upper section of said hook,
    (b) obtaining a fire hose;
    (c) inserting the fire hose into said cradle of said implement through said opening;
    (d) gripping said grasping member by hand; and
    (e) pulling said implement so as to move said implement and the inserted fire hose.

2. The method recited in claim 1, wherein (1) said grasping member has a first end and a second end, (2) said first end of said grasping member is attached to a first end of a first side member, (3) said second end of said grasping member is attached to a first end of a second side member, and (4) a second end of said first side member and a second end of said second side member are attached to said lateral midpoint of said upper section of said hook.

3. The method recited in claim 1, wherein said grasping member is coplanar with said upper section.

4. A method of anchoring an uncoiled pressurized fire hose upon ground, comprising the steps of:

(a) obtaining an implement, including at least:
  (1) a hook, comprising:
    (A) a laterally extending upper section,
    (B) a laterally extending lower section longitudinally spaced from said upper section,
    (C) a longitudinally extending central section interconnecting said upper section and said lower section,
    (D) a longitudinally extending upper extension laterally spaced from said central section and extending from said upper section in a first longitudinal direction towards said lower section,
    (E) a longitudinally extending lower extension laterally spaced from said central section and extending from said lower section in a second longitudinal direction towards said upper section, and
    (F) wherein said lower extension and said lower section form a cradle and said upper extension and said lower extension are longitudinally spaced to form an opening, and
  (2) a grasping member attached to a lateral midpoint of said upper section of said hook,
(b) obtaining a fire hose;
(c) inserting the fire hose into said cradle of said implement through said opening;
(d) positioning said implement such that said grasping member is positioned underneath the inserted hose;
(e) placing said grasping member in contact with the ground; and
(f) resting a human body upon said lower section of said hook so as to apply pressure upon said lower section of said hook towards the inserted fire hose and thereby reduce slippage of the fire hose through said hook during release of pressurized water from the fire hose.

5. The method recited in claim 4, wherein (1) said grasping member has a first end and a second end, (2) said first end of said grasping member is attached to a first end of a first side member, (3) said second end of said grasping member is attached to a first end of a second side member, and (4) a second end of said first side member and a second end of said second side member are attached to said lateral midpoint of said upper section of said hook.

6. The method recited in claim 4, wherein said grasping member is coplanar with said upper section.

* * * * *